Patented Feb. 23, 1943

2,311,979

UNITED STATES PATENT OFFICE 2,311,979

PROCESS FOR DEHYDROGENATION OF HYDROCARBONS

Ben B. Corson, Pittsburgh, Pa., and Maurice W. Cox, Chicago, Ill., assignors to Universal Oil Products Company, Chicago, Ill., a corporation of Delaware No Drawing. Application March 15, 1940, Serial No. 324,088

4 Claims. (Cl. 260—668)

This invention relates to catalytic materials useful in accelerating conversion reactions involving loss of hydrogen from organic materials, particularly hydrocarbons, and more specifically to the preparation of granular composited materials comprising essentially major proportions of substances having relatively low catalytic activity and minor amounts of substances having relatively high dehydrogenating activity suitable for use in organic reactions involving the loss of hydrogen.

It is frequently desirable to dehydrogenate various types of hydrocarbons to produce unsaturated or more highly unsaturated substances, the dehydrogenated products being more reactive with various reagents and more readily subject to polymerization or condensation reactions. For example, aromatic hydrocarbons may be produced by selective removal of hydrogen from hydro-aromatic hydrocarbons present in fractions of naphthenic petroleums. This treatment generally increases the antiknock value of distillates of motor fuel boiling range. In the case of normally gaseous paraffinic hydrocarbons comprising ethane, propane, and butanes which remain after the olefins have been polymerized from cracked gas mixtures, it may be desirable to produce further amounts of polymerizable olefins by dehydrogenation reactions. There are many other instances in which dehydrogenation of hydrocarbons may be carried out to produce more valuable products; for example, paraffinic hydrocarbons containing 4 or more carbon atoms in straight chain arrangement may be dehydrogenated progressively, first to produce a mono-olefin such as butene from butane, and secondly to form a di-olefin such as butadiene. Other paraffins containing 6 or more carbon atoms in straight chain arrangement may also undergo dehydrogenation and ring closure to produce aromatic hydrocarbons.

In one specific embodiment the present invention comprises a process for improving catalyst composites, particularly those of a selective dehydrogenating character, which consists in intimately associating an oxide of an alkaline earth metal with mixtures of oxides of aluminum and chromium to form a catalytic material with high dehydrogenating activity and relatively low carbon-forming tendency.

Considerable work which has been done on reactions involving dehydrogenation of hydrocarbons in the presence of catalysts comprising essentially mixtures of alumina with an oxide of chromium, shows the outstanding value of these materials with respect to the catalytic activity and selectivity in promoting the desired reactions. However, these catalysts gradually lose catalytic effectiveness during treatment of hydrocarbons not only as a result of the reduction of active catalytic surface by gradual deposition thereon of carbonaceous and hydrocarbonaceous materials produced in secondary reactions, but also because they undergo gradual crystallization to less active forms. In using such catalysts, general practice is to process a given hydrocarbon charge for a limited period of time corresponding to a limited decrease in catalytic activity, and then to reactivate the catalyst by subjecting it to contact with an oxidizing gas mixture, for example, air or combustion gas mixtures of varying oxygen content, to burn off such carbonaceous deposits. Because of the fact that it is almost impossible to avoid some local overheating both during processing and reactivating periods in catalyst sections of commercial size and to the fact that commercial capacities require the use of the maximum permissible temperatures to hasten reactivation, there is a pronounced tendency for permanent changes to occur in both the superficial and interior structures of the catalyst granules with a resultant decrease in porosity and a decrease in effective catalytic surface.

The present invention comprises an improvement in alumina-chromia catalysts whereby a decrease is effected in the carbon-forming tendency generally exhibited during dehydrogenating use. Furthermore, the catalyst structure also may be thus stabilized by the addition of an alkaline earth oxide and crystallization of the more active catalyst component may be substantially arrested presumably by the formation of double oxides which are resistant to the higher temperatures frequently employed in the reactivation periods. It may be that such double oxides act as binders and/or spacers of a highly refractory nature which prevent the reduction of surface by fluxing or sintering. The amount of alkaline earth oxide necessary for stabilization will vary more or less with the ratio of chromia to alumina, the method of preparation, and other factors, but in general the amount used may be within the range of approximately 1–15% by weight of the composite. However, higher percentages may be employed in some cases without reducing the activity of the catalyst.

In the preparation of these catalysts aluminum oxide may be considered as the basic supporting material or carrier. Aluminum oxide either hydrated or anhydrous exists in a large variety of modifications. The minerals hydrargillite and gibbsite have the general formula $Al_2O_3.3H_2O$ in common, bauxite has the general formula $Al_2O_3.2H_2O$, and the minerals diaspore and böhmite have the general formula $Al_2O_3.H_2O$. The substantially anhydrous oxide $Al_2O_3$ occurs in the form of corundum, alpha alumina, beta alumina, and gamma alumina. Each of these modifications has a different crystalline structure, a different specific gravity, and various stabilities at various temperatures. Further modifications of aluminum oxide are produced when aluminum hydroxide is precipitated from solutions of aluminum salts and these are dehydrated at different temperature levels.

The various forms of aluminum oxide produced by the calcination of naturally hydrated minerals and hydrated precipitates have been employed to a great extent as catalysts and catalyst carriers. Experience has indicated that some forms are considerably better than others but owing to the largely empirical state of the art involving catalysts and catalytic reactions generally, comparatively little is known as to the relative merits of the different forms of aluminum oxide in different types of catalytic reactions.

Gamma-alumina, which is a particularly good variety for use in the manufacture of alumina-chromia catalysts, may be formed by ignition of crystalline aluminum ortho-hydroxide having the formula $Al_2O_3.3H_2O$ or $Al(OH)_3$ at temperatures above 250° C. but preferably not above 350-500° C. until a substantial equilibrium is established corresponding to the removal of substantially all of the water and the formation of crystals falling within the regular or cubic classification. The oxide thus formed is stable up to temperatures of approximately 950-1000° C. at which point it is converted to the alpha modification which corresponds in crystal structure to the natural mineral corundum, $Al_2O_3$. Gamma aluminum oxide may also be produced by heating the monohydrate, $Al_2O_3.H_2O$, known as Böhmite. It apparently cannot be produced however by heating the material of exactly the same composition known as diaspore, a naturally occurring aluminum mineral.

The element chromium has several oxides, the three best known having the formulas $CrO_2$ $Cr_2O_3$, and $CrO_3$. The sesquioxide $Cr_2O_3$ is readily produced by heating salts of chromium or the trioxide in hydrogen or hydrocarbon vapors at temperatures above 300° C. The dioxide (chromic chromate) $CrO_2$, has been considered to be an equimolecular mixture of the trioxide, $CrO_3$, and the sesquioxide, $Cr_2O_3$. The oxides are readily developed on the surface and in the pores of activated alumina granules by utilizing primarily solutions of chromic acid, $H_2CrO_4$ or chromic nitrate, $Cr(NO_3)_3$. Ignition of the chromic acid, the nitrate, or a precipitated trihydroxide produces primarily the trioxide which then may be reduced by any suitable means to the sesquioxide to furnish active catalytic material for use in dehydrogenating reactions. The chromium component may constitute 2 to 20% or more of the finished catalyst.

Several different methods may be employed to produce the refractory catalysts of the present invention, although not necessarily with equivalent results. In one method, for example, alumina granules preferably of the so-called activated variety made by controlled calcination of the natural hydrated aluminum oxides, or precipitated aluminum hydroxide are saturated with solutions of salts of an alkaline earth metal and a water soluble chromium compound. Such salts are employed preferably in the form of a relatively concentrated solution in an amount sufficient to give the required proportions of alkaline earth oxide and chromium oxide, and the resultant catalyst granules are then dried at approximately 100° C. Variations in the procedure are possible such as saturating granules of activated alumina with a solution of a water soluble chromium compound before or after addition of water soluble alkaline earth compound. Instead of using activated alumina in the preparation of such dehydrogenation catalysts, aluminum hydrate may be so employed and various methods of depositing the active chromium ingredient and stabilizing alkaline earth compounds may be used. These methods may thus include coprecipitation of hydroxides of chromium and of an alkaline earth metal on hydrate of alumina which consists in absorbing an alkaline earth acid chromate on aluminum hydrate granules and then adding a concentrated solution of sodium sulfite to a suspension of the granules in water. By keeping this suspension at a moderately elevated temperature for a considerable time, the following reaction occurs slowly:

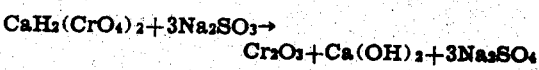

$$CaH_2(CrO_4)_2 + 3Na_2SO_3 \rightarrow$$
$$Cr_2O_3 + Ca(OH)_2 + 3Na_2SO_4$$

Catalysts of relatively wide variations in composition are comprised within the scope of the present invention. The ratio of chromia to alumina may be varied over a considerable range without unduly lessening the catalytic activity of the composites although the optimum ratio will vary with the exact method of manufacture. There is seldom any advantage in having more than approximately 20% by weight of chromium sesquioxide referred to the total weight of the catalyst composite, although due to the stabilizing effect resulting from addition of the alkaline earth compounds, much higher percentages of chromium sesquioxide may be employed than in the absence of alkaline earth metal compounds without the danger of the chromium sesquioxide crystallizing and becoming less active. In regard to the optimum amount of alkaline earth compound to be added, this will vary with the ratio of chromia to alumina, but in general the preferred quantity of alkaline earth oxide will generally be in the range of 1-15% by weight of the total catalyst, depending upon the size of the crystals of alumina, the size of the catalyst granules or pellets, and the nature of the alkaline earth metal compound.

In the pelleting of the present types of catalyst either before or after incorporation of the chromium and/or alkaline earth metal compound, various lubricants may be employed to prevent sticking in the machines which generally comprise a series of dies and punches. These lubricants may consist of graphite, metal soaps such as, for example, aluminum stearate and other metal stearates, hydrogenated vegetable oils, etc., the amount of the lubricant being frequently less than 10° by weight of the composite. The lubricant, which is substantially removed during the calcination and activation of the catalyst, has substantially no influence upon the dehydrogenating activity of the catalyst.

When the catalytic material is employed in hydrocarbon dehydrogenating reactions the temperatures usually employed are in the approximate range of 450-750° C. In regeneration of the catalyst to remove carbonaceous deposits by the use of oxidizing gases, relatively high temperatures of the order of 750° C. or higher are employed which may cause the formation of double compounds and prevent the deterioration of the catalyst structure by crystallization of the chromic oxide as previously described. At the temperatures employed in processing, the original chromic oxide is partly decomposed to chromium sesquioxide and partly reduced by the action of the hydrocarbon.

Composite catalysts of the present character are usually best employed in the form of pellets or otherwise formed particles in sizes corresponding to approximately 4-20 mesh which are used as filler in reaction tubes. The type of reactor best suited to a particular reaction will depend to a large extent upon the amount and character of heat involved, that is the extent to which the particular dehydrogenating reaction is endothermic. In the case of the dehydrogenation of hydrocarbons to produce primary reaction products corresponding to a loss of one molecule of hydrogen, it is usually most advantageous to employ low time factors, and the granular catalysts are usually best employed in relatively short tubes which are arranged in parallel between distributing headers, the tubes themselves being surrounded by evaporating or circulating fluids which tend to extract or add heat and maintain a relatively constant temperature. In case longer time factors are required as in reactions corresponding to more extensive dehydrogenation and dehydrocyclization, longer tubes may be employed or the units may be used in series.

When the present type of catalysts are employed under proper conditions of temperature, pressure, and rates of flow of organic compounds, they possess a relatively long life before their activity diminishes to any appreciable extent. When, however, they become depreciated to an undesirable extent due to gradual deposition thereon of carbonaceous materials, their activity is readily restored by oxidation with air or other oxidizing gas mixture at a moderately elevated temperature of the order of 500° C. which effectively removes carbon and tars which contaminate the surfaces of the particles and decrease their efficiency. It is characteristic of the present types of catalysts that they may be reactivated repeatedly without material loss of catalytic efficiency, and that higher temperatures may be employed to hasten the reactivation without fear of changing their structure.

The following illustrative data are given to show the improved character of the results obtained by the use of the present type of catalysts over those obtained when using alumina-chromia catalysts previously known in the art, although the data are not to be considered as imposing undue limitations upon the scope of the invention as herein stated:

The preparation of the catalyst was as follows: Granulated alumina was impregnated with a water solution of chromic acid and an alkaline earth nitrate and the mixture was dried on a water bath. The dried mixture was mixed with 4% of aluminum stearate (pelleting lubricant) and fabricated in the form of 3 x 3 mm. pellets. The pellets were heated in air for 15-20 minutes at above 500° C. to remove excess water and to decompose the aluminum stearate and chromic acid. Several calcined pelleted materials, each containing an alkaline earth metal oxide, were used as catalysts in the dehydrogenation of n-butane to butenes at 600° C. under substantially atmospheric pressure. The operating sequence consisted in treating the catalyst with air at the operating temperature for 15-20 minutes, purging with nitrogen for approximately 5 minutes to expel oxygen-containing gases from the catalyst, and then contacting n-butane with the catalyst for a period of 45 minutes using an hourly butane charging rate corresponding to a gaseous space velocity of 1500. Results on olefin production and carbon deposition on the catalyst during comparable processing periods (45 minutes duration) are given in Table I.

TABLE I

*Effect of the presence of alkaline earth oxides on the butane dehydrogenating activity and carbon-forming tendency of chromia-alumina catalysts*

| Added oxide | Olefin in exit gas, volume percent | | Carbon formation, weight percent of used catalyst |
|---|---|---|---|
| | Ethylene | Propene and higher olefins | |
| None | 0.7 | 23.9 | 6.7 |
| Calcium | 0.5 | 26.2 | 3.7 |
| Strontium | 0.2 | 25.6 | 3.2 |
| Barium | 1.2 | 24.6 | 3.9 |

The character of the invention and the type of results obtainable by its use in practice will be evident from the preceding specification and example given, although they are not to be considered as imposing undue limitations upon its generally broad scope.

We claim as our invention:

1. A process for dehydrogenating hydrocarbons which comprises subjecting the same at a dehydrogenating temperature in the approximate range of 450-750° C. to the action of an alumina-chromia catalyst containing a sufficient quantity of an alkaline earth metal oxide to substantially reduce the carbon-forming tendency of the catalyst at said temperature.

2. A process for dehydrogenating hydrocarbons which comprises subjecting the same at a dehydrogenating temperature in the approximate range of 450-750° C. to the action of an alumina-chromia catalyst containing a sufficient quantity of calcium oxide to substantially reduce the carbon-forming tendency of the catalyst at said temperature.

3. A process for dehydrogenating hydrocarbons which comprises subjecting the same at a dehydrogenating temperature in the approximate range of 450-750° C. to the action of an alumina-chromia catalyst containing a sufficient quantity of barium oxide to substantially reduce the carbon-forming tendency of the catalyst at said temperature.

4. A process for dehydrogenating hydrocarbons which comprises subjecting the same at a dehydrogenating temperature in the approximate range of 450-750° C. to the action of an alumina-chromia catalyst containing a sufficient quantity of strontium oxide to substantially reduce the carbon-forming tendency of the catalyst at said temperature.

BEN B. CORSON.
MAURICE W. COX.